United States Patent [19]

Massieu et al.

[11] Patent Number: 5,464,972

[45] Date of Patent: Nov. 7, 1995

[54] OMNIDIRECTIONAL BAR CODE LABEL SCANNER

[75] Inventors: Jean-Louis Massieu, Montauban; Serge Thuries, Saint-Jean, both of France

[73] Assignee: Reflexion Plus, Chatou, France

[21] Appl. No.: 84,557

[22] Filed: Jun. 29, 1993

[30] Foreign Application Priority Data

Jul. 1, 1992 [FR] France ..................... 92 08088

[51] Int. Cl.$^6$ ..................................... G06K 7/10
[52] U.S. Cl. ............................. 235/462; 235/472
[58] Field of Search ........................ 235/462, 467, 235/473

[56] References Cited

U.S. PATENT DOCUMENTS

| | | | |
|---|---|---|---|
| 2,929,061 | 3/1960 | Dauguet | 343/117 |
| 3,643,068 | 2/1972 | Mohan et al. | 235/61.11 E |
| 4,699,447 | 10/1987 | Howard | 350/6.9 |
| 4,871,904 | 10/1989 | Methtsky | 235/467 |
| 4,939,356 | 7/1990 | Rando | 235/467 |
| 4,962,311 | 10/1990 | Poisel et al. | 250/216 |
| 5,256,865 | 10/1993 | Wike | 235/462 |

FOREIGN PATENT DOCUMENTS

| | | |
|---|---|---|
| 0344364 | 12/1989 | European Pat. Off. . |
| 0414281 | 2/1991 | European Pat. Off. . |
| 1192907 | 10/1959 | France . |
| 2208459 | 5/1973 | Germany . |

*Primary Examiner*—Donald Hajec
*Assistant Examiner*—Karl D. Frech
*Attorney, Agent, or Firm*—Litch, Even, Tabin & Flannery

[57] ABSTRACT

An omnidirectional bar code label scanner includes a conventional deviator comprising a mirror rotating about a main axis at the center of a ring of reflective facets. A thin beam directed along the axis is deviated by 90° to scan the successive facets and form a star pattern with 13 segments in a scanning plane. A light collector aimed at the scanning plane passes light reflected from a bar code label centered at a scanning center to a photosensor. To reduce the accuracy with which the label needs to be centered, a laser beam emitter directs a beam onto a rotating mirror a normal to which is at a small angle of inclination to the rotation axis. The reflected beam traces out a narrow aperture cone and is reflected 90° by the fixed mirror towards the rotating mirror. As a result, the center of the star pattern traces out an ellipse around the scanning center.

10 Claims, 2 Drawing Sheets

OMNIDIRECTIONAL BAR CODE LABEL SCANNER

BACKGROUND OF THE INVENTION

1. Field of the invention

The present invention concerns an omnidirectional bar code label scanner comprising a source producing a thin parallel light beam, a dynamic deviator adapted to scan said beam in a pattern centred on a main axis substantially normal to a plane scanning area across which the beam is scanned and through which the label passes, and a photosensor with a light collector aimed at the scanning area to generate a signal corresponding to the bar code that it carries when the pattern passes longitudinally over the label, the deviator comprising scanning optics centred on the main axis and comprising a reflective ring with facets arranged in a regular frustum of a pyramid and a mirror at the center of the ring rotating at constant speed about the main axis on which the beam impinges along said axis so as to scan each facet of the ring consecutively and form at each a reflected beam which traces a diametral segment of the pattern in the scanning area.

2. Description of the prior art

The bar code system is very widely used to identify articles of all kinds in a way that can be read by a machine so that the article codes are identified automatically by scanning a rectangular label carrying a succession of transverse lines that are alternately dark and light and whose width is an integer multiple (usually between 1 and 3) of a unit width. The bar code is read by scanning the label optically in its longitudinal directional at an approximately constant speed to generate an electrical signal corresponding to the code carried by the label.

Scanners moved by hand over the labels have been used to read the bar code; the problem of maintaining a constant scanning speed makes these devices difficult to use effectively without repeating the scanning several times and the response is slow. Automatic scanners are of two main types, "hand" scanners and "swipe" scanners.

Hand scanners comprise a probe with an entry side which is applied to the label in a precise orientation, an unfocussed light source and an optical system which projects an image of the label disposed against the entry window onto a photosensitive strip that is scanned electrically (charge-coupled devices).

Swipe scanners include the type used at the checkouts of supermarkets and the like where the label is passed across the scanner in an approximately transverse direction and a rotating mirror system comprising several differently inclined facets at the center of a faceted reflecting ring forms a pattern comprising several differently oriented parallel arrays. These scanners are relatively tolerant as to the position of the label but relatively intolerant as to its orientation.

Omnidirectional scanners, with which the present invention is concerned, are of the kind defined in the above preamble. The pattern produced by the rotating mirror and the faceted reflective ring comprises the same number of diametral segments as there are facets on the ring, equiangularly spaced and intersecting at their center on the main axis. This pattern will be referred to where appropriate hereinafter as a radiating pattern.

The segments cross at a point on the main axis in a particular plane (median plane) in the scanning area at a specific distance from the ring. In any plane other than the median plane the segments are tangential to an inscribed circle. The depth of field is determined by the condition that the diameter of the inscribed circle must be small relative to the width of the label.

Effective scanning of the label requires that at least one segment of the radiating pattern passes longitudinally across the label, intersecting all the lines of the bar code carried by the label.

This implies that the angle between two successive diametral segments is less than the acute angle between the diagonals of the rectangle occupied by the lines of the bar code and that the point of intersection of these diagonals is sufficiently close to the center of the pattern. This therefore requires relatively accurate positioning of the label in the scanner.

Incidentally, to obtain a signal with clear transitions readily identifiable by the associated electronics, the diameter of the parallel light beam must be small relative to the unit width of the bar code. The light source is usually a far red semiconductor laser producing a sufficiently small beam cross-section with sufficient energy.

An object of the present invention is to provide an omnidirectional bar code scanner tolerant of significant inaccuracy in the location of the label in and relative to the median plane of the scanning area.

SUMMARY OF THE INVENTION

The present invention consists in an omnidirectional bar code label scanner comprising a source producing a thin parallel light beam, a dynamic deviator adapted to scan said beam in a pattern centred on a main axis substantially normal to a plane scanning area across which the beam is scanned and through which the label passes, and a photosensor with a light collector aimed at the scanning area to generate a signal corresponding to the bar code that it carries when the pattern passes longitudinally over the label, the deviator comprising scanning optics centred on the main axis and comprising a reflective ring with facets arranged in a regular frustum of a pyramid and at the center of the ring a mirror rotating at constant speed about the main axis on which the beam impinges along said axis so as to scan each facet of the ring consecutively and form at each a reflected beam which traces a diametral segment of the pattern in the scanning area, said deviator comprising on the upstream side of the scanning optics an auxiliary member producing from an incident light beam path an emergent path which, by virtue of rotation at a speed which is slow relative to that of the scanning optics mirror, traces out a narrow aperture cone, whereby the center of the pattern created by the scanning optics traces out a closed curve centered on said main axis in said scanning area at said slow speed.

As the novel arrangement of the invention causes the center of the radiating pattern to trace out a closed curve at the same rate at which the auxiliary member rotates, it is sufficient for the center of the label to remain within the closed curve for one period of rotation of the auxiliary member for at least one segment of the pattern to scan the label correctly. As a corollary to this, the depth of field is also significantly increased. The scanning optics mirror and auxiliary member rotation speeds are preferably coherent, that is to say in a ratio such that the pattern obtained by combination of the radiating pattern produced in one period of rotation of the scanning optics mirror and the tracing out of the closed curve by the center of the pattern in one period of rotation of the auxiliary member is stationary or at least quasi-stationary. The scanning optics mirror and auxiliary member rotation speeds are preferably in a ratio which is a rational fraction. If this fraction is P/Q, P and Q have no common integer divisor and P>Q, the combined pattern will have a period Q times that of the rotation of the auxiliary member. In a preferred embodiment the auxiliary member comprises a mirror rotating about a drive axis, a normal to the mirror being at an angle to said drive axis which is half the half-angle at the summit of the cone traced out by the emergent path. The incident path preferably impinges on the auxiliary member substantially on the drive axis with an angle of incidence of approximately 45°. The summit of the cone is then at the center of the mirror and the right cross-section of the cone is an ellipse whose major and minor axes are in a ratio of √2:1.

The cone traced out by the emergent path conveniently has an axis intersecting and substantially orthogonal to the main axis and the scanning optics conveniently comprise, at the summit of the angle formed by the aforementioned two axes, a plane reflector whose normal bisects this angle. This separates the auxiliary member from the scanning optics.

It is beneficial for this plane reflector to incorporate a reflective obverse side and for a light source adapted to define a light spot on the main axis in the scanning area after reflection from the obverse side to be aligned with the axis of the cone traced out by the emergent path opposite to the auxiliary member. This light spot provides a marker for placing the label correctly.

In a preferred embodiment of the invention the light collector of the photosensor comprises an optical waveguide adapted to direct any light ray impinging on an entry surface to a photosensitive component at a far end of the waveguide by virtue of multiple reflections from its walls. A collector of this kind is afocal.

An optical waveguide of this kind may comprise a member in the shape of a body of revolution made from a refractive material whose size decreases from a plane entry face to the photosensitive component. The body of revolution may be a paraboloid, the photosensitive component being disposed in the focal plane. This yields a substantially afocal light collector with a wide effective aperture.

Secondary features and advantages of the invention will emerge from the following description given by way of example with reference to the appended drawings.

DETAILED DESCRIPTION OF THE INVENTION

Figure 1:
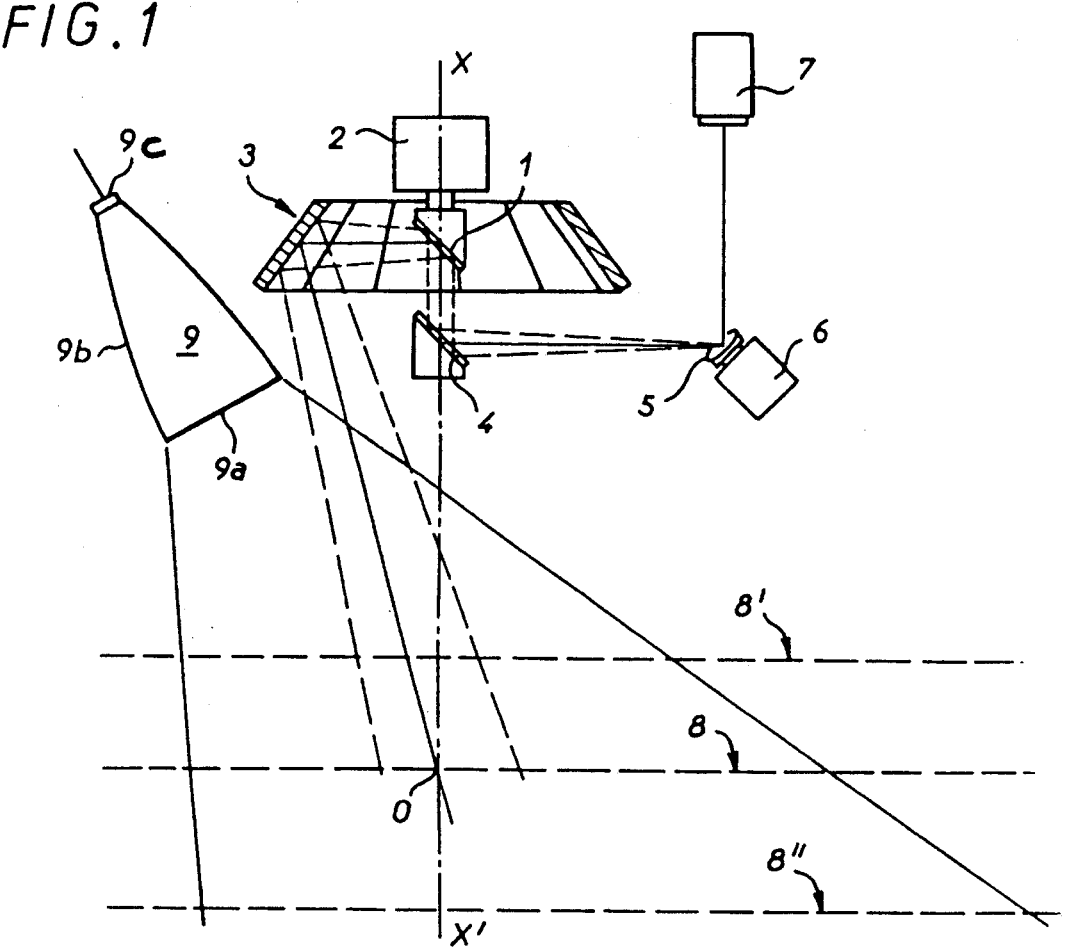
FIG. 1 is a diagram showing an omnidirectional scanner in accordance with the invention.

In the selected embodiment of the invention shown in FIG. 1 the omnidirectional bar code label scanner has a main axis X–X' normal to a scanning plane 8 which intersects the plane of the figure along a straight line and through which it passes at a center O referred to hereinafter as the scanning center. Ideally, the label is offered up in this plane, facing the X end of the X–X' axis and with its center coincident with the scanning center O in the plane 8.

The X–X' axis is not necessarily vertical and can assume any appropriate orientation normal to the plane in which the label is offered up. The X–X' axis would be horizontal if the label were stuck onto the side of a parallelpiped-shape package, for example. However, to facilitate the description it will be assumed that the X–X' axis is vertical, the scanning plane 8 is horizontal and the scanner lies over the label.

A plane mirror 1 at 45° to the X–X' axis is rotated about the X–X' axis by a motor 2 so that a narrow parallel light beam which may be regarded as a light ray directed upwardly along this axis is reflected in a plane normal to the axis and rotates about this axis at the same speed as the mirror 1.

Around the rotating mirror 1 is a ring of 13 reflective facets 3 defining the sides of a regular pyramid with a base perpendicular to the X–X' axis in the shape of a 13-sided regular polygon. Each facet median line is inclined to the X–X' axis at an angle such that a light ray impinging on the mirror 1 along the X–X' axis and reflected by the mirror normally to this axis towards the median line of the facet is reflected by the facet and passes through the center O. This system comprising the rotating mirror 1 and the faceted ring 3 is referred to hereinafter as the scanning optics.

As the mirror rotates the light ray reflected by the mirror 1 is scanned across all the facets of the ring 3 in succession. An incident light ray rotating in a plane normal to the X–X' axis is reflected by a facet and traces out, in the scanning plane 8, a straight line segment through the center O parallel to the intersection of the facet with the plane normal to the X–X' axis. The complete pattern is thus a star centered at O and comprising 13 equi-angularly spaced diameters of a circle centered at O, in other words 26 branches.

If a label is placed in the scanning plane 8 with its center at the scanning center O, at least one of the diameters or pairs of branches of the star pattern will scan the full length of the label. Depending on whether the transverse lines are light and strongly reflective or dark and weakly reflective, the quantity of diffusely reflected light received by a light collector 9 and transmitted to a photosensor 9c will be high or low. The photosensor produces an electrical signal with high and low levels imaging the label bar code. Appropriate software distinguishes complete signals imaging the label bar code from truncated signals resulting from oblique scanning.

The arrangement as described so far is well known and widely used. It has the drawback that for the bar code to be read correctly the center of the label must be very near the scanning center O. An offset in the scanning plane can lead to a situation in which none of the pairs of branches of the pattern scans the full length of the label. If the label is offered up in a plane parallel to the scanning plane and either above it (8') or beyond it (8") the center of each segment is evidently shifted relative to the axis, the segment remaining parallel to the segment in the scanning plane. The segments are therefore tangential to a circle centered on the X–X' axis. The patterns produced in these planes are effective only if the offset of the label center relative to the axis and the orientation of the label are correlated with each other.

According to the invention, a fixed mirror 4 at 45° to the X–X' axis intersects the axis substantially at its center and is disposed between the mirror 1 which is referred to hereinafter as the main mirror and the scanning plane 8. A laser beam emitter 7 produces a parallel beam whose cross-section diameter is small relative to the unit width of the transverse lines of the bar code on the labels in order to obtain signals with clear transitions. The far red laser beam is parallel to the X–X' axis so that the axis of the beam from the emitter 7 and the X–X' axis together define a plane containing the normal to the mirror 4 and the rotation axis of a motor 6 of an auxiliary mirror 5. In this plane the beam from the emitter 7 is orthogonal to and intersects a normal to the X–X' axis at the point on the mirror 4 where the X–X' axis passes through it and the axis of the motor 6 bisects the right angle between the beam emitted by the emitter 7 and the normal to the X–X' axis at the mirror 4. At the summit of this right angle is a plane auxiliary mirror 5 rotated by the motor 6. The normal to the auxiliary mirror 5 is at an angle $\alpha$ of a few degrees to the axis of the motor 6.

If the angle $\alpha$ were 0° the beam emitted by the emitter 7 would evidently be reflected by the auxiliary mirror 5 along the normal to the X–X' axis and after reflection at the mirror 4 would be directed towards the main mirror 1 along the X–X' axis. Because of the non-null angle $\alpha$ the path of the beam reflected by the mirror 5 traces out the generatrices of an elliptical directrix cone. The half-angle at the summit in the plane through the X–X' axis and the axis of the beam emitted by the emitter 7 is $2\alpha$ for the major axis and $\sqrt{2}\alpha$ for the minor axis.

Following reflection at the fixed mirror 4, the rotating mirror 1 and the faceted ring 3, the center of the star pattern traces out in the scanning plane 8 and at the same speed as the motor 6 rotates a substantially elliptical closed curve defined by the intersection of the cone, after triple reflection, and the scanning plane. The star pattern is slightly degraded by the three successive reflections but its essential character is preserved.

To a first approximation, if the center of the label is inside the ellipse traced out by the center of the star pattern at least one segment of the complete pattern will pass longitudinally across the label from one end to the other. The expression "complete pattern" refers to the set of separate star patterns traced out between two consecutive times at which the main mirror 1 and the auxiliary mirror 5 assume simultaneously the same relative position. The auxiliary mirror 5 also increases the depth of field. In a plane 8' nearer the ring 3 than the scanning plane 8 and in a plane 8" farther from the ring the center of the pattern traces out an ellipse around the point at which the main axis passes through the plane 8' or 8" with the result that there is still a high probability of effective scanning of the label centered near the X–X' axis.

To give an idea of the orders of magnitude involved, with an angle $\alpha$ of 2.5°, a rotation speed of the main mirror 1 of 100 rpm, a rotation speed of the auxiliary mirror 5 of 20 rpm and 13 segments per revolution of the main mirror 1 there will be 65 segments per revolution of the auxiliary mirror 5. Note that after one revolution of the auxiliary mirror 5 the main mirror 1 has rotated exactly five times and the two mirrors are in the same relative position. The recurrence period of the complete pattern is thus 50 ms.

The total number of segments in the complete pattern may be increased by modifying the ratio of the speeds of the main motor 2 and the auxiliary motor 6 so that it is no longer an integer but a rational fraction. For the two mirrors to return to their original position simultaneously the main mirror 1 must have completed a number of revolutions equal to the lowest common multiple of the terms of the fraction (simplified so that they have no common integer divisor). Choosing a fraction of $11/2$, for example, the main motor 2 rotates at 110 rpm and the auxiliary motor 6 at 20 rpm. The recurrence period is increased to 100 ms and the number of segments in the complete pattern to 130. In practise the main motor 2 is a synchronous motor with a permanent magnet rotor and the motor 6 is a stepper motor. A clock with appropriate dividers controls the two motors coherently.

The light collector 9 comprises a block of refractive material having a refractive index n and delimited at the sides by a paraboloid 9b whose axis intersects the plane 8 at the center O and an entry face 9a normal to the axis of the paraboloid 9b. The parabolic wall 9b is mirror polished so that total reflection occurs for an angle of incidence exceeding Arc sin 1/n. The photosensor 9c is in a plane normal to the paraboloid axis and containing the paraboloid focus. Light rays impinging on the entry face 9a are reflected and this reduces their angle to the axial direction of the collector 9. They reach the photosensor 9c after a relatively small number of reflections, dependent on the angle of incidence (only one reflection for normal incidence). The light collector thus has a very wide angular aperture and has virtually no focussing effect. This minimizes dependence on the distance away from the label.

The wavelength of the laser beam produced in the emitter 7 by a semiconductor laser diode is at the far red end (higher wavelength end) of the visible spectrum. This is an economic way of producing sufficient light power and filtering can be used to eliminate a major part of the ambient light which would generate noise if it impinged on the photosensor 9c. It also avoids the requirement for the label medium and the ink in which the darker lines are printed to have different optical characteristics (absorption and reflection), as would be necessary with infrared light.

Nevertheless, because of the rotation speeds and the number of segments the pattern is not visible on a surface on which the label is placed. It is beneficial to show the center 0 of the scanning plane to prevent the label being placed outside the usable field of the deviator.

Figure 2:
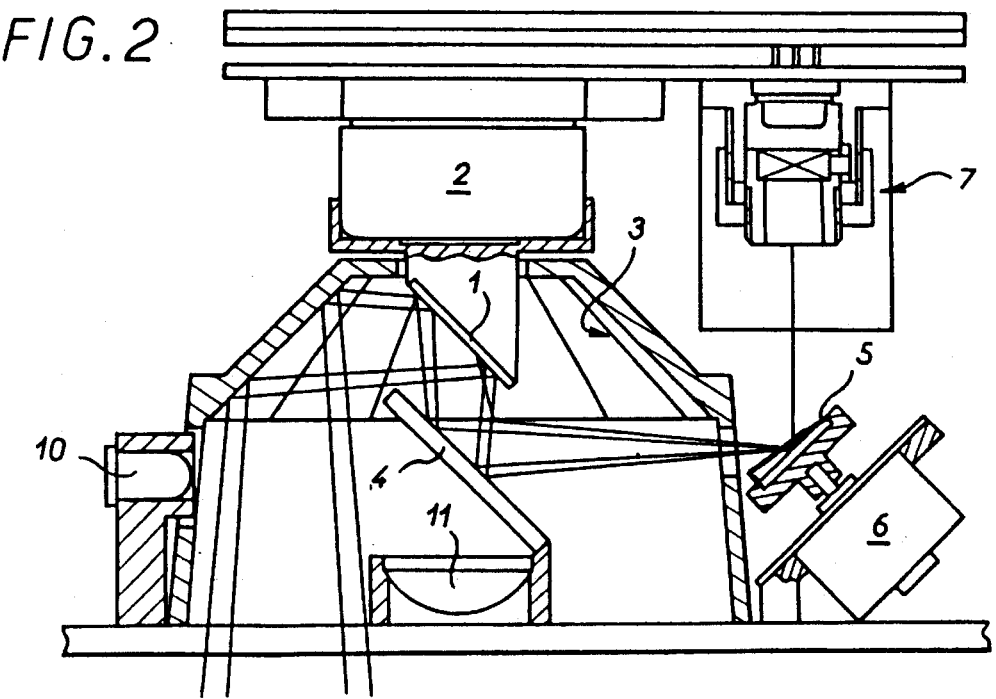
FIG. 2 is a view in transverse cross-section of a deviator system of the omnidirectional scanner.

Referring to FIG. 2, the fixed mirror 4 is a plane parallel plate reflective on both sides. A green light-emitting diode 10 is aligned with the axis of the cone generated by the auxiliary mirror 5 and on the opposite side of the fixed mirror 4 compared to the mirror 5. The light beam produced by the diode 10 is reflected at the obverse side of the mirror 4. After reflection its axis is coincident with the main X–X' axis (FIG. 1). A lens 11 focuses the reflected beam at the center O of the scanning plane. Given that the distance between the lens 11 and the center O of the scanning plane is large relative to the distance travelled by the beam between the diode 10 and the lens 11, the image of the diode 10 has a great depth of field. In this way the beam emerging from the lens 11 shows the main X–X' axis adequately over the entire depth of field of the deviator, between the planes 8' and 8" (FIG. 1), producing a small green spot in the scanning plane on which the label to be decoded is readily centered, at least approximately.

Figure 3:
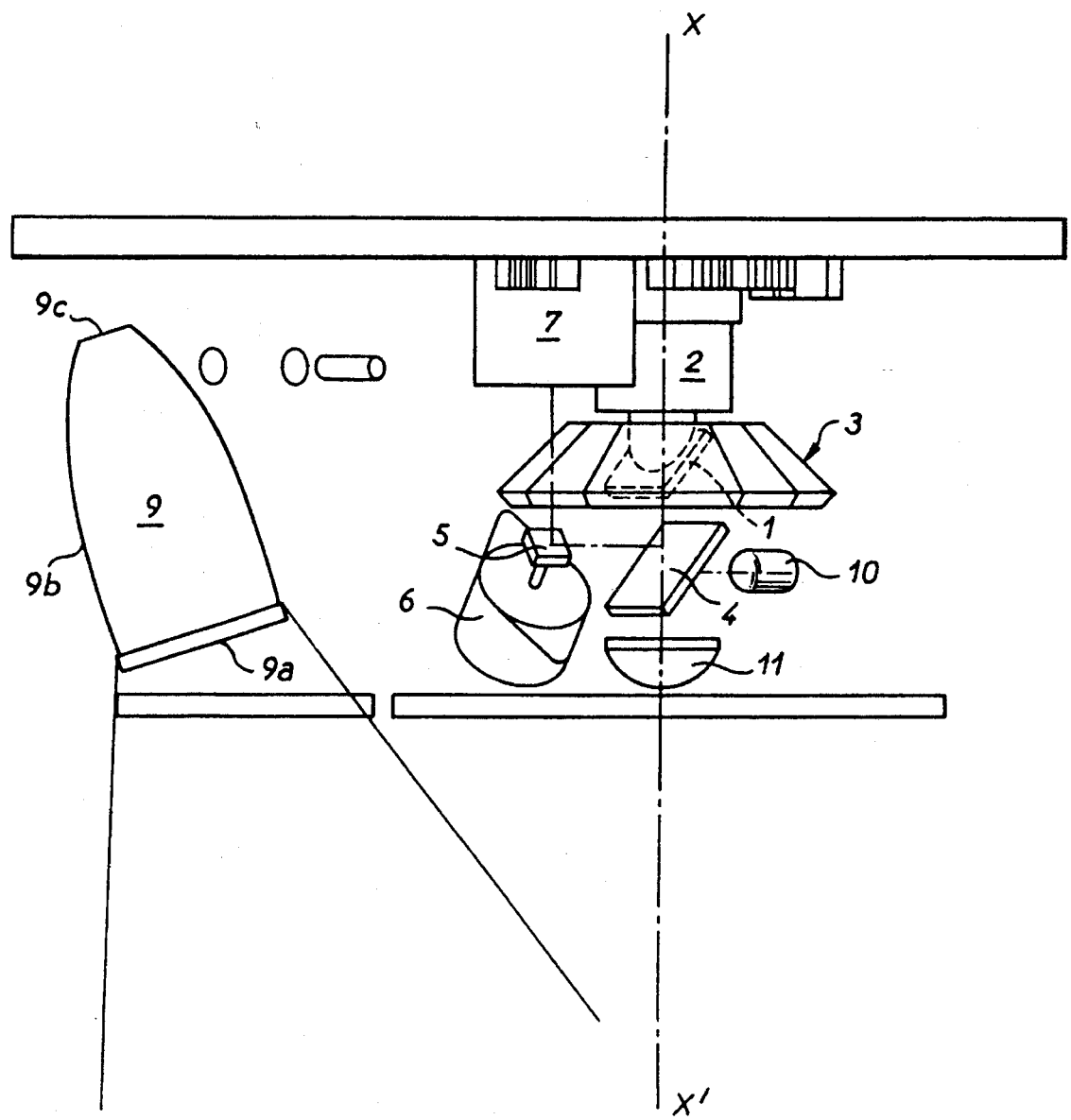
FIG. 3 is a side view in elevation showing the relative positions of the deviator and the light collector.

FIG. 1 is a diagrammatic representation and, to clarify the description, is not drawn to scale. Likewise, the light collector 9 is shown in the same plane at the laser beam emitter and the auxiliary mirror 5. FIG. 3 is a side view of the scanner and shows that the plane containing the X–X' axis and the axis of the light collector 9 is at an angle of approximately 60° to the plane containing the main X–X' axis and the axis of the emitter 7, the center of the auxiliary mirror 5 and the diode 10, in order to obtain a compact arrangement.

As already mentioned in passing, the X–X' axis may be vertical (FIG. 1) and the scanning plane horizontal. However, the deviator system comprising the mirrors 1, 4 and 5, the ring 3 and the collector 9, with the associated electronics, may be assembled into a compact projector adjustably mounted on a base to cater for any desirable orientation of the scanning plane.

Of course, the invention is not limited to the example described but encompasses all variant executions thereof within the scope of the claims. In particular, the number of facets on the ring 3 and the orientation of the axis of the motor 6 in conjunction with the position and the orientation of the laser beam emitter can be modified, as can the construction of the light collector.

There is claimed:

1. Omnidirectional bar code label scanner comprising a source producing a thin parallel light beam, a dynamic deviator adapted to scan said beam in a pattern, having a center, on a plane scanning area across which the beam is scanned and through which the label passes, and a photosensor with a light collector aimed at the scanning area to generate a signal corresponding to the bar code that it carries when the pattern passes longitudinally over the label, the deviator comprising scanning optics centred on a main axis and comprising a reflective ring with facets arranged in a regular frustum of a pyramid and at the center of the ring a mirror rotating at constant speed about the main axis on which the beam impinges along said axis so as to scan each facet of the ring consecutively and form at each a reflected beam which traces a diametral segment of the pattern in the scanning area, said deviator comprising on an upstream side of the scanning optics an auxiliary member for moving a center of the pattern in a curve centered on the main axis of the scanning area, the auxiliary member comprising apparatus for producing from an incident light beam path an emergent path which, by virtue of rotation at a speed which is slow relative to that of the scanning optics mirror, traces out a narrow aperture cone at the scanning optics mirror, whereby the center of the pattern created by the scanning optics traces out a curve centered on said main axis in said scanning area at said slow speed.

2. Scanner according to claim 1 wherein the rotation speeds of said scanning optics mirror and said auxiliary member are coherent.

3. Scanner according to claim 2 wherein the rotation speeds of said scanning optics mirror and said auxiliary member are in a ratio equal to a rational fraction.

4. Scanner according to claim 1 wherein said auxiliary member comprises a second mirror adapted to be rotated about a drive axis, the angle between a normal to said second mirror and said drive axis being equal to half the half-angle at an apex of said aperture cone traced out by said emergent path.

5. Scanner according to claim 4 wherein said incident path impinges on said auxiliary member mirror substantially on said drive axis with an angle of incidence to said axis of approximately 45°.

6. Scanner according to claim 4 wherein said cone traced out by said emergent path has an axis intersecting and substantially orthogonal to said main axis, said scanning optics comprising at the summit of the angle defined by said two axes a plane reflector the normal to which bisects said angle.

7. Scanner according to claim 6 wherein said plane reflector is disposed between said scanning optics rotating mirror and said scanning area, said reflector comprises a reflective obverse side and said scanner comprises, aligned with the axis of said cone traced out by said emergent path from said auxiliary member and opposite said member, a light source adapted to define a light spot on said main axis in said scanning area after reflection from said obverse side of said reflector.

8. Scanner according to claim 1 wherein said light collector of said photosensor comprises an optical waveguide adapted to direct any light ray impinging on an entry face to a photosensor by successive reflection from its walls.

9. Scanner according to claim 8 wherein said optical waveguide is a body of revolution about an axis, is made from a refractive material and decreases in size from a plane entry face to said photosensor.

10. Scanner according to claim 9 wherein said body of revolution is delimited laterally by a paraboloid having a focal plane and said photosensor is disposed in the focal plane of said paraboloid.

\* \* \* \* \*